Oct. 10, 1950   F. A. NOVOTNEY   2,525,424
BALANCING MEANS FOR TAIL GATE ELEVATORS
Filed June 20, 1947   4 Sheets-Sheet 1

Inventor
Frank A. Novotney
by Parker & Carter
Attorneys.

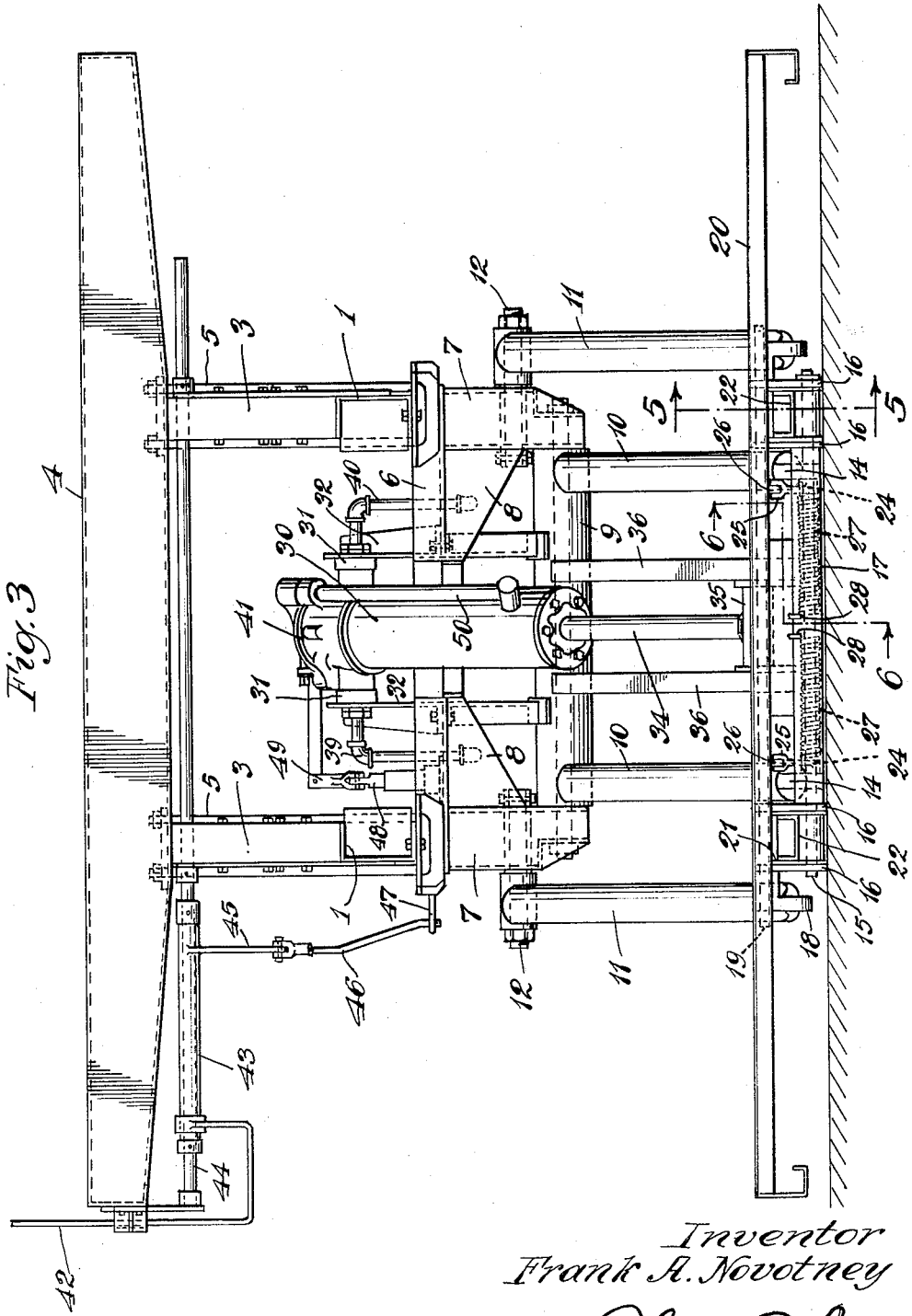

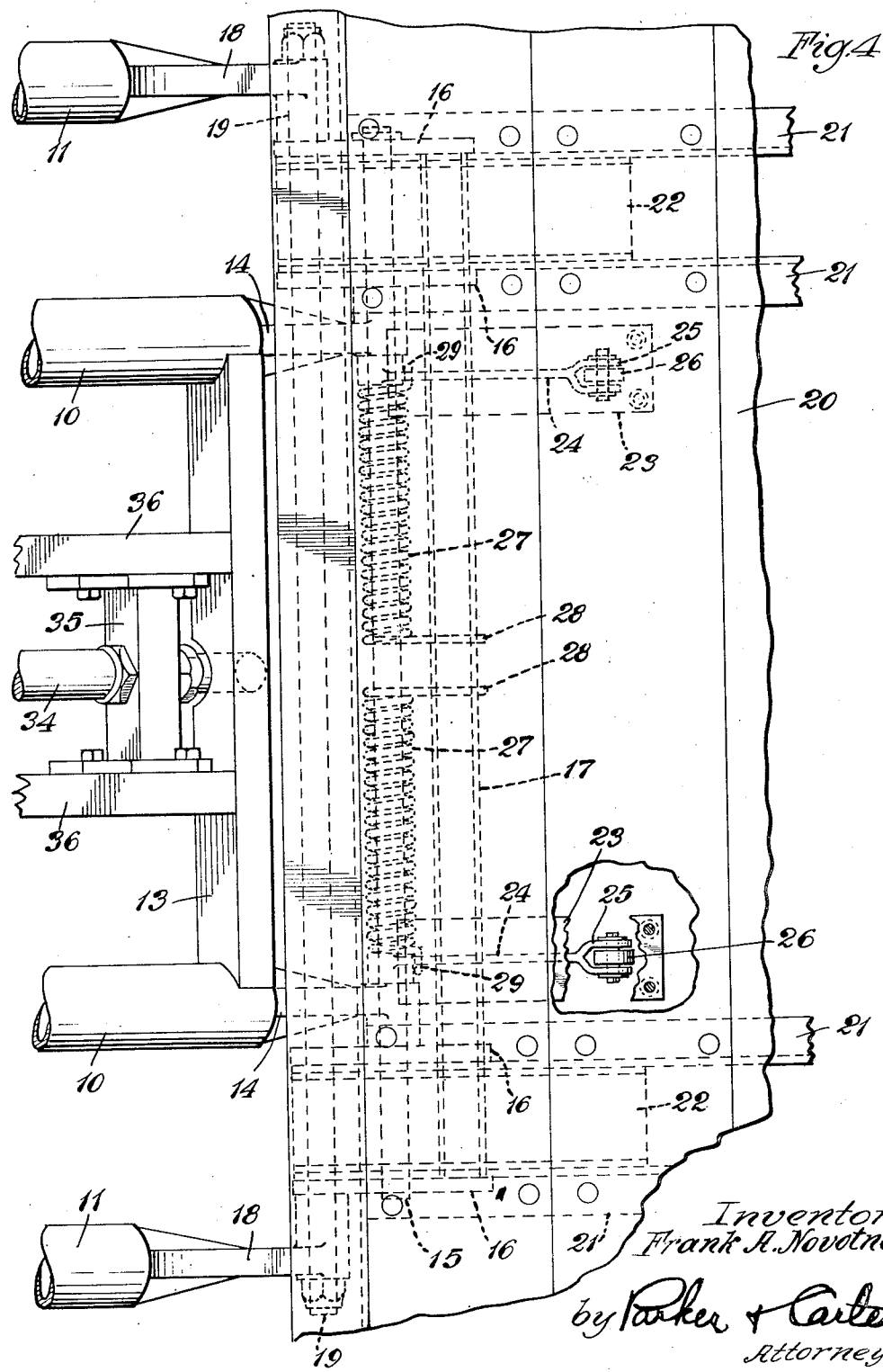

Oct. 10, 1950   F. A. NOVOTNEY   2,525,424
BALANCING MEANS FOR TAIL GATE ELEVATORS
Filed June 20, 1947   4 Sheets-Sheet 4
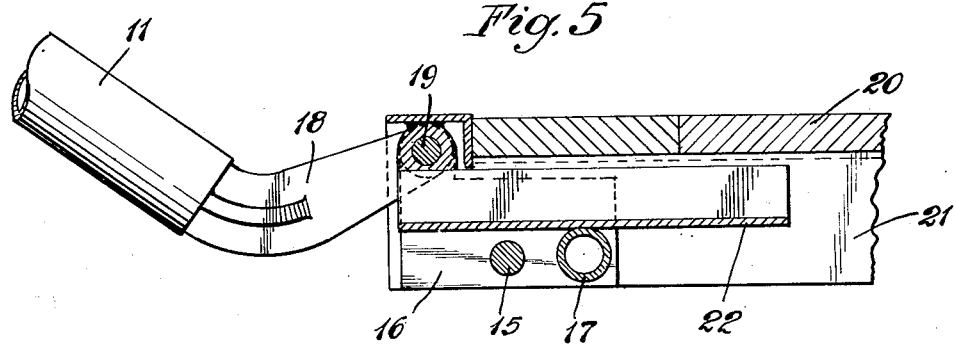
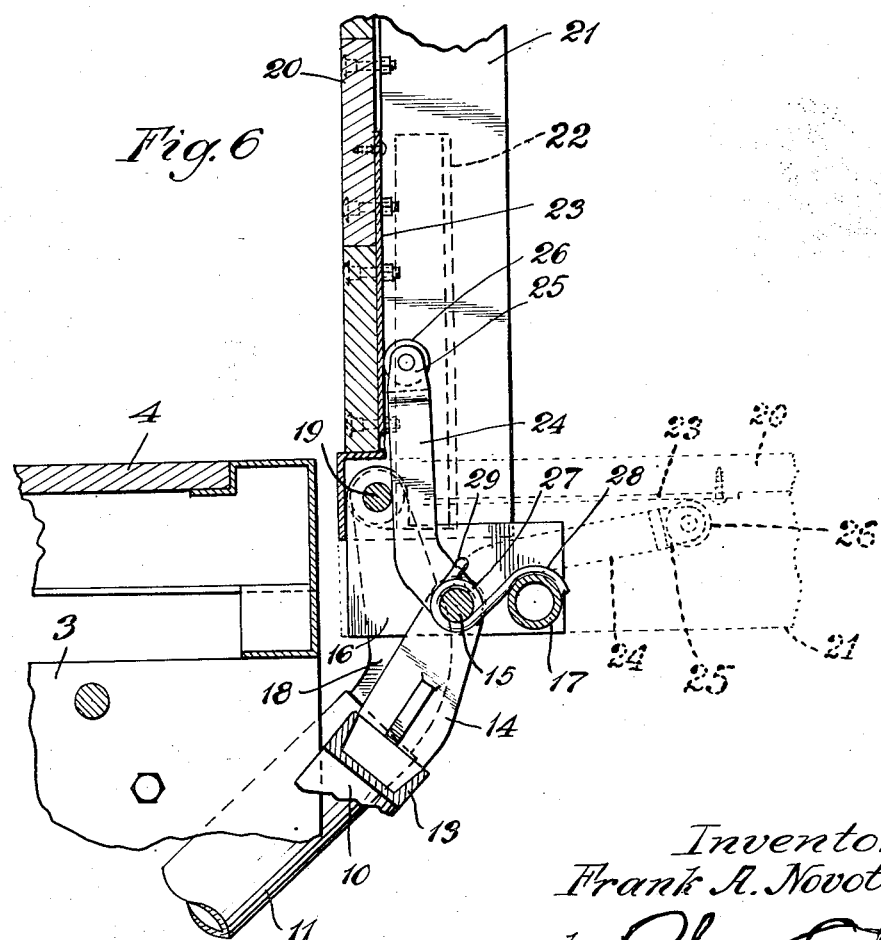
Inventor
Frank A. Novotney
by Parker + Carter
Attorneys Patented Oct. 10, 1950

2,525,424

UNITED STATES PATENT OFFICE 2,525,424

BALANCING MEANS FOR TAIL GATE ELEVATORS

Frank A. Novotney, Streator, Ill., assignor to Anthony Company, Streator, Ill., a corporation of Illinois Application June 20, 1947, Serial No. 755,955

7 Claims. (Cl. 214—77)

This invention relates to an elevating platform or tailgate of the type designed to be mounted upon and relatively moved with respect to a support.

In the particular form here shown this elevating member or platform is associated with an automotive truck but it is not limited to that purpose or association.

Another object is to provide, in connection with an elevating member which may serve as a tailgate of a truck or as a closure for a compartment, means for counterbalancing the weight of the gate to assist its movement into closing position.

Other objects will appear from time to time throughout the specification and claims.

This invention is illustrated more or less diagrammatically in the accompanying drawings, wherein:

Figure 3 is an end elevation of the structure of Figures 1 and 2;

Figure 4 is a plan view with parts broken away and parts in section;

Figure 5 is a sectional detail taken at line 5—5 of Figure 3, showing the tailgate in lowered position;

Figure 6 is a fragmentary sectional view taken at line 6—6 of Figure 3, showing the tailgate in raised and closed position in full lines and in raised but unclosed position in dotted lines.

Like parts are indicated by like characters throughout the specification and the drawings.

Figure 1:
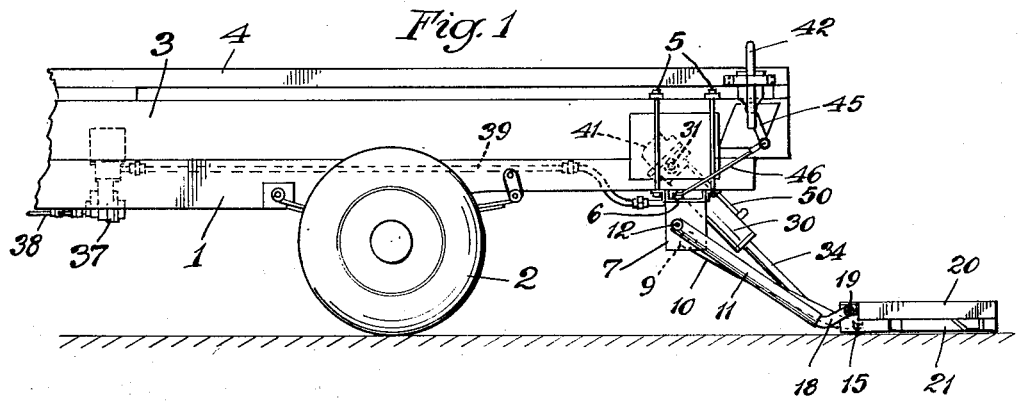
Figure 1 is a side elevation of an automotive truck with the elevating member mounted on it.

The device as shown is mounted on a truck which is indicated generally by the numeral 1 and the truck is provided with wheels 2. A frame or subframe member 3 may be applied to the truck frame, and upon this is mounted a platform 4 which carries the load. This arrangement is merely typical of one use of the device. The side walls or top of the truck body are omitted but the device may be used with an open body, a stake body, a closed body or a body of any type.

If the subframe 3 is used, it may conveniently be fastened to the truck by U-bolts 5.

A transverse frame member 6 is secured to the body or the frame and serves as a means for supporting the hydraulic piston and cylinder assembly. The particular details of this frame member and other frame members form no essential part of the present invention, which may be embodied in a raising and lowering mechanism having almost any suitable framing construction. For that reason these features are described only sufficiently to explain the essential features of the present invention.

Extending downwardly from the member 6 are projections 7 which may also be joined to the member 6 by reinforcing or stiffening webs 8. A generally tubular member 9 is pivoted in the members 7 and is provided with a pair of rearwardly extending arms 10. Pivoted above the member 9 are two arms 11, 11 which are positioned outwardly with respect to the arms 10 and are pivoted upon the members 7, as at 12.

The arms 10 are joined by a transverse member 13 from which members 14 extend. These members extend slightly out of line with the longitudinal axis of the members 10 and are pivoted, as at 15, to a shaft or rod which is fixed in plates or fittings 16. These plates serve as a part of the frame upon which the platform or tailgate is mounted. A rod or tube 17 extends transversely between the plates 16.

The arms 11 are provided with inclined or bent extensions 18 which are pivoted, as at 19, to a rod or shaft which is also fixed to the plates 16. The load carrying surface of the tailgate or platform is formed of surface members 20 which are stiffened by frame members 21 and by load carrying parts 22, which also serve as strengthening and stiffening members. On the bottom or undersurface of the members 21 there are positioned two or more plates 23 which act as wearing surfaces. Fixed upon the member 15 are one or more arms 24. These arms are bifurcated at their free ends, as at 25, and carry rollers 26.

Coil springs 27 are positioned about the member 15 and as shown in Figures 4 and 6, one end of each spring is fixed, as at 28, about the tubular member 17. The opposite end of each spring is fixed, as at 29, about one of the arms 24. The springs are biased each to tend to force its respective arm 24 upwardly. The spring and arm structures therefore form, in effect, counterweights or counterbalancing means which tend to assist in swinging the tailgate from the dotted line position of Figure 6 to the full line position of that figure and to assist in carrying a substantial portion of the load of the tailgate when the latter is tipped to the raised position.

Figure 2:
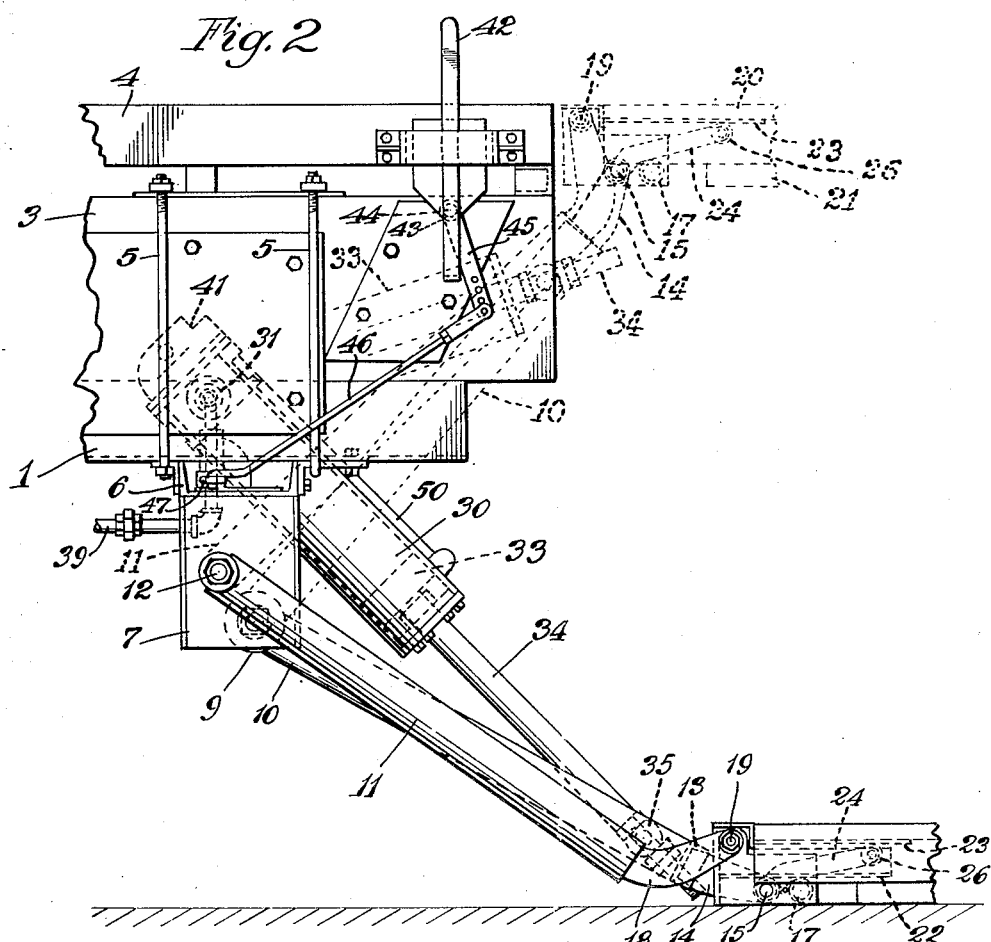
Figure 2 is an enlarged elevation of a portion of the truck, showing the elevating or lifting tailgate in the lowered position in full lines and in the raised position in dotted lines.

The raising means for raising the gate from the full line position of Figure 2 to the dotted line position of that figure is in the particular form here shown hydraulic, but other raising means might be used and the invention is not limited to this particular raising means. As shown, the raising or elevating means includes a cylinder 30 pivoted, as at 31, on supports 32. A piston 33 is positioned within the cylinder and a piston rod 34 extends outwardly therefrom. The piston rod may be adjustably fixed at its outer end in a bearing member 35 which is mounted between frame members 36. These members are secured to the member 9 and to the member 13.

Pressure fluid is furnished to the hydraulic system by a pump 37 which is driven by a shaft 38 from the vehicle engine or some other engine on the vehicle. Conduits 39 and 40 lead to and from the pump and connect the pump with the cylinder. Valve means are enclosed in a housing 41 which is fixed to the cylinder and moves with it. The valve means are operated by a handle 42 secured to a sleeve 43 mounted on a shaft or rod 44.

A lever 45 extends from the sleeve 43 and by means of a link 46 and a member 47 is connected to a part 48 which is connected to the valve operating member 49.

The invention is not limited to any particular operating means, but it is preferable to have means for operating the valve so located that they can be conveniently reached. A pipe or conduit 50 extends from the valve housing 41 toward the outer end of the cylinder, and it is available for pressure fluid which can be discharged below the piston 33 to cause the latter to be forced upwardly into the cylinder and to draw the piston rod into the cylinder and thus to raise the platform to the position shown in dotted lines in Figure 2.

Although I have shown an operative form of my invention, it will be recognized that many changes in the form, shape and arrangement of parts can be made without departing from the spirit of the invention, and my showing is, therefore, to be taken as, in a sense, diagrammatic.

The use and operation of this invention are as follows:

The device when associated with a truck or a vehicle will ordinarily serve as a tailgate when the vehicle is not being loaded or unloaded. Although they have been omitted from this application, means for enclosing the load carrying surface of the member 4 and for latching the tailgate in the position of Figure 6 may obviously be used.

If it be assumed that the body is to be loaded, the tailgate will be lowered to the position of Figures 1, 2 and 3. The parts are heavy enough to carry the tailgate to the lowered position by gravity. It is sufficient merely to manipulate the valve in the housing 41 to permit the operating fluid to be forced outwardly through the member 50 as the parts descend from the dotted line position of Figure 2 to the full line position of that figure. With the platform on the ground or other surface on which the truck is standing, material to be loaded is placed on the platform or tailgate and the pressure fluid is then directed below the piston 33 and the piston is drawn inwardly into the cylinder and the parts are raised to the dotted line position of Figure 2, in which the upper surface of the tailgate is approximately on a level with the surface of the member 4.

The load is then pushed from the tailgate onto the body and the tailgate may be lowered again for further loading. When the loading operation is finished the tailgate is raised and it is then tilted from the dotted line position of Figure 6 to the full line position of that figure and it may be latched or otherwise secured in this position, if desired.

The counterbalancing springs 27 serve in large measure to counterbalance the weight of the tiltable portion of the tailgate structure. In use the tailgate structure may be a very heavy member. It must be strong enough to support heavy loads when the vehicle is loaded and unloaded. Consequently, it is a difficult member to push upwardly to the full line position of Figure 6 by hand. The counterbalancing structure so nearly counterbalances the weight of the tilting part that it requires very little effort for an operator to raise the tailgate portion to the closing position. Also, it requires very little effort to return it to the loading position, but the counterbalancing means prevent the tailgate from falling violently to the loading position. The counterbalancing means thus serve to assist in raising the tailgate to the body closing position and to make its return movement safe and gentle enough to make injury to an operator unlikely, if not impossible.

I claim:

1. In combination, an automotive vehicle and a combined tailgate and load carrying member therefor, movable means connecting said load carrying member to said vehicle, and means for raising said load carrying member, said load carrying member including a frame portion and a gate portion tiltable with respect thereto, and gate counterbalancing means, said gate counterbalancing means including spring means disposed between said frame and gate and biased so as to tend to tilt said tilting gate portion with respect to said frame, said spring means being positioned beneath and covered by said gate portion.

2. In combination, an automotive vehicle and a combined tailgate and load carrying member therefor, movable means connecting said load carrying member to said vehicle, and means for raising said load carrying member, said load carrying member including a frame portion and a gate portion tiltable with respect thereto, and gate counterbalancing means engaging said frame portion and effective on said tilting tailgate portion, said gate counterbalancing means including torsion spring means mounted on the frame substantially parallel to the tilting axis of said gate and biased so as to tend to tilt said tilting gate portion with respect to said frame, said spring means being positioned beneath and covered by said gate portion.

3. In combination, an automotive vehicle and a combined tailgate and load carrying member therefor, movable means connecting said load carrying member to said vehicle, and means for raising said load carrying member, said load carrying member including a frame portion and a gate portion tiltable with respect thereto, and gate counterbalancing means, said gate counterbalancing means including spring means disposed between said frame and gate and biased so as to tend to tilt said tilting gate portion with respect to said frame, there being a lever arm pivoted on said frame and contacting said tilting gate portion, said spring means being effective on said lever arm and tending to move said arm in the tilting direction of said gate.

4. In combination, an automotive vehicle and a combined tailgate and load carrying member therefor, movable means connecting said load carrying member to said vehicle, and means for raising said load carrying member, said load carrying member including a frame portion and a gate portion tiltable with respect thereto, and gate counterbalancing means, said gate counterbalancing means including torsion spring means biased to tilt said tilting gate portion with respect to said frame, there being a plurality of lever arms pivoted on said frame and contacting said tilting gate portion, said spring means being torsionally stressed and effective on said arms and tending to move said arms in the tilting direction of said gate.

5. In combination, an automotive vehicle and a combined tailgate and load carrying member therefor, movable means connecting said load carrying member to said vehicle, and means for raising said load carrying member, said load carrying member including a frame portion and a gate portion tiltable with respect thereto, and gate counterbalancing means engaging said frame portion and effective on said tilting tailgate portion, said gate counterbalancing means including torsion spring means, there being a lever arm pivoted on said frame and contacting said tilting gate portion, said torsion spring means being torsionally stressed about the pivotal axis of said lever arm and biased so as to tend to move said arm in the tilting direction of said gate.

6. In combination, an automotive vehicle and a combined tailgate and load carrying member therefor, movable means connecting said load carrying member to said vehicle, and means for raising said load carrying member, said load carrying member including a frame portion and a gate portion tiltable with respect thereto, and gate counterbalancing means engaging said frame portion and effective on said tilting tailgate portion, said gate counterbalancing means including spring means biased to tilt said tilting gate portion, there being a plurality of lever arms pivoted on said frame and contacting said tilting portion, said spring means biased to move said arms in the tilting direction of said gate.

7. In combination, an automotive vehicle and a combined tailgate and load carrying member therefor, movable means connecting said load carrying member to said vehicle, and hydraulic means for raising said load carrying member, said load carrying member including a frame portion and a gate portion tiltable with respect thereto, and gate counterbalancing means engaging said frame portion and effective balancing means engaging said frame portion and effective on said tilting tailgate portion, said gate counterbalancing means including spring means biased to tilt said tilting gate portion, there being a plurality of lever arms pivoted on said frame and contacting said tilting portion, said spring means biased to move said arms in the tilting direction of said gate.

FRANK A. NOVOTNEY.

REFERENCES CITED

The following references are of record in the file of this patent:

UNITED STATES PATENTS

| Number | Name | Date |
|---|---|---|
| 587,082 | Shanks et al. | July 27, 1897 |
| 2,258,383 | Haniquet | Oct. 7, 1941 |
| 2,348,993 | Novotney | May 16, 1944 |
| 2,350,641 | Ruddock | June 6, 1944 |
| 2,390,268 | Penney | Dec. 4, 1945 |
| 2,391,412 | Gorton | Dec. 25, 1945 |
| 2,391,813 | Wood | Dec. 25, 1945 |
| 2,414,684 | Wohlforth | Jan. 21, 1947 |